United States Patent [19]
McNickle et al.

[11] Patent Number: 5,558,341
[45] Date of Patent: Sep. 24, 1996

[54] SEAL FOR SEALING AN INCOMPRESSIBLE FLUID BETWEEN A RELATIVELY STATIONARY SEAL AND A MOVABLE MEMBER

[75] Inventors: Alan D. McNickle, Sellersville; Mingfong Hwang, Lansdale, both of Pa.; Adam N. Pope, Cincinnati, Ohio

[73] Assignee: Stein Seal Company, Kulpsville, Pa.

[21] Appl. No.: 371,283

[22] Filed: Jan. 11, 1995

[51] Int. Cl.$^6$ ..................................... F16J 15/34
[52] U.S. Cl. .............. 277/3; 277/75; 277/96.1; 277/175; 277/192; 277/201; 277/215
[58] Field of Search .................. 277/3, 75, 96.1, 277/142, 154, 175, 192, 201, 214, 215

[56] References Cited

U.S. PATENT DOCUMENTS

| | | | |
|---|---|---|---|
| 3,575,424 | 4/1971 | Taschenberg | 277/142 |
| 3,804,424 | 4/1974 | Gardner | 277/96.1 |
| 4,082,296 | 4/1978 | Stein | 277/3 |
| 4,145,058 | 3/1979 | Hady et al. | 277/96.1 |
| 4,406,466 | 9/1983 | Geary, Jr. | 277/96.1 |
| 5,137,284 | 8/1992 | Holder | 277/96.1 |
| 5,145,189 | 9/1992 | Pope | 277/157 |
| 5,169,159 | 12/1992 | Pope et al. | 277/96.1 |
| 5,174,584 | 12/1992 | Lahrman | 277/96.1 |

FOREIGN PATENT DOCUMENTS

| 377600 | 6/1964 | Switzerland | 277/96.1 |
|---|---|---|---|

OTHER PUBLICATIONS

"New Oil and Gas Seals from Burgmann", Diesel & Gas Turbine Worldwide, Jul.–Aug. 1994, p. 8.
"Design Analysis of Rayleigh–Step Floating–Ring Seals", Artiles et al.—ASLE/ASME Lubrication Conference, Oct. 1983.
"Testing of Helium–Buffered, Rayleigh–Step, Floating-Ring Seals", R. Hamm et al., ASLE, May 1986, Toronto, Canada.

Primary Examiner—William A. Cuchlinski, Jr.
Assistant Examiner—John L. Beres
Attorney, Agent, or Firm—Zigmund L. Dermer

[57] ABSTRACT

A seal structure is provided having a configuration with a very small seal gap between a relatively stationary seal member and a complementary surface on a movable (rotatable) member (such as a rotating shaft) adjacent to which the stationary seal member is mounted. The stationary seal member is movable toward and away from the movable seal member so as to vary the seal gap therebetween. The seal is effective in applications where an incompressible fluid is provided on the high pressure side of the stationary seal member so that leakage along the seal gap is of an incompressible fluid into a lower pressure region on the other side of the seal gap. A sealing dam is provided on the stationary seal member on its sealing face adjacent the low pressure end of the seal gap. A plurality of elongated pads are formed on the sealing surface of the stationary seal member on the high pressure side of the sealing dam, extending perpendicularly to the direction of leakage flow along the seal gap. Lift pockets are formed in predetermined pads and positioned such that fluid is forced into the pocket by the velocity shearing gradient between the movable and stationary members to generate an increased pressure in the pockets to move the stationary seal member away from the movable member to increase the seal gap between the two. The lift pocket is of a depth sufficient, in the event of wear of the lift pocket surface, to result in a pressure increase in the lift pocket as a consequence of its reduction in depth to move the seal member away from the movable member, thereby causing the seal gap to become self-regulating in size. Several embodiments and modifications are presented.

10 Claims, 9 Drawing Sheets

SEAL FOR SEALING AN INCOMPRESSIBLE FLUID BETWEEN A RELATIVELY STATIONARY SEAL AND A MOVABLE MEMBER

BACKGROUND OF THE INVENTION

It is well known that a reduction in the size of a seal gap between a stationary (i.e., non rotating) seal member and a movable member, such as a rotating shaft surrounded by the stationary seal member, changes dramatically the amount of leakage through the seal gap. For a given seal gap—for example, one of 5 mils (0.005 inches)—a reduction in the size of the seal gap to one-half mil (0.0005 inches), i.e., an order of magnitude reduction of the seal gap, will reduce the leakage of an incompressible fluid through the gap by $10^{-3}$, i.e., a reduction in fluid flow (leakage) to one one-thousandth of the prior flow. Many seal applications serve to separate different media located in adjacent portions of a housing—for example, a lubricating liquid medium on one side of the seal is separated from a gaseous medium on the other side of the seal. These media may be required to be at different pressures—for example, the lubricating medium may be at high pressure and the gaseous medium may be at a lower pressure. Irrespective of the pressure difference between the media, it is desirable to minimize the leakage of one medium into the other medium for certain applications, since, for example, oil leaking into a gaseous medium may well contaminate that medium. Thus for seal applications where there is a controlled leakage across the seal, it is important to maintain the seal gap as small as possible, thereby minimizing the mixing of the two media, and likewise, requiring smaller equipment for handling the in-flow and leakage of liquid into a gas containing region. In certain applications where long lived seals are required, bushing type seals have been used between a rotating shaft and a housing to isolate a lubricating medium, employed, for example, for lubricating shaft bearings, from another medium within the housing employed for other purposes within the device. Bushing seals run at relatively high clearances proportional to the shaft size, such clearances being in the neighborhood of 5 mils (0.005 inches), and therefore have a significant amount of lubricant leakage through the seal. It is desired by manufacturers of certain equipment such as electrical generators, particularly hydrogen cooled machines, pumps, compressors and other turbo machinery, to have a high reliability seal, i.e., a seal with little wear and long life, with as low a leakage therethrough as possible. Thus, if the leakage flow through a bushing seal could be reduced by an order of magnitude, e.g., from 5 mils to 0.5 mils, without sacrificing the long life and reliability of the seal, it would be a boon to such manufacturers.

The problem associated with seals having such small seal clearances is that the seal clearances frequently are dependent upon the speed of rotation of the rotating shaft. This is not ordinarily a problem during normal operation of the device, since many such devices operate at a constant speed. However, problems of seal wear and of maintenance of seal clearance can arise during the periods of transient operation of the equipment employing the seal, i.e., during start-up or shut-down of the rotating equipment. Of course, certain equipment has varying speeds of shaft operation, and the speed of rotation of the shaft influences the seal gap by either increasing or decreasing the seal gap (seal clearance).

In addition, in seal applications with very low clearances and therefore very little leakage, the quantity of cooling fluid transported to the seal member particularly adjacent to the seal gap or clearance is significantly reduced. This may result in undesirable heating of the seal components, causing distortion thereof which will vary the size of the seal gap and reduce seal lifetime.

It is therefore desirable to provide a seal for a rotating shaft designed with a very small seal gap wherein the size of the seal gap is maintained reasonably constant during variations in shaft speed. In addition, it is desirable to provide a seal with a reasonable flow of coolant along most, if not all, of the seal gap in order to prevent thermally induced distortion of the seal components. This invention provides a seal structure which solves the above-described problems.

BRIEF SUMMARY OF THE INVENTION

This invention creates a seal structure with a configuration which provides a very small seal gap between a relatively stationary seal member and a complementary surface on a movable (rotatable) member (such as a rotating shaft) adjacent to which the stationary seal member is mounted. The relatively stationary seal member, however, is movable toward and away from the movable seal member so as to vary the seal gap therebetween. The seal is effective in applications where an incompressible fluid is provided on the high pressure side of the stationary seal member so that leakage along the seal gap is of an incompressible fluid into a lower pressure region on the other side of the seal gap. A sealing dam is provided on the stationary seal member on its sealing face adjacent the low pressure end of the seal gap. A plurality of elongated pads are formed on the sealing surface of the stationary seal member on the high pressure side of the sealing dam, with their longitudinal dimension extending perpendicularly to the direction of leakage flow, respectively, i.e., perpendicular to the flow from the high pressure side to the low pressure side of the sealing surface. The pads are separated from each other by a groove in the seal surface extending between adjacent pads from the high pressure side of the seal surface to the high pressure side of the sealing dam. Predetermined pads have pockets of predetermined size formed therein which are exposed to the seal gap and which extend perpendicularly from one of the grooves into the pad and terminate short of the next adjacent groove.

Thus, the pockets extend essentially transversely of the direction of leakage flow across the seal, i.e., along the longitudinal dimension of the pad, and a predetermined number of such pockets are formed in certain of the pads in a generally symmetric array such that at least one pocket is formed in each of two pads; however, if desired, each of the pads may have a pocket formed therein. Since the open end of the pocket is exposed to fluid flowing through the transverse groove, the pockets are formed to extend into the pads in a direction such that upon rotation of the shaft, fluid is forced into the pocket by the velocity shearing gradient between the movable and stationary members to generate an increased pressure in the pockets greater than the pressure in the high pressure chamber of the seal housing. Resilient means are provided to urge the stationary seal member into engagement with the rotating member so that upon shaft rotation, pressure is built up in the pockets of the pads to move the stationary seal member away from the movable seal surface against the force of the resilient means to provide a seal gap. The size of the seal gap is dependent upon the pressure difference across the stationary seal member, the speed of rotation of the shaft, the temperature of the incompressible fluid and the length, width and depth of the pockets. In accordance with the invention, the depth of the pockets is at least about 15 milli-inches, so that in the event of wear of the pads resulting in a reduction in pocket depth, the force generated in the now shallower pocket is increased to increase the seal gap. Thus, wear of the pads serves to increase the pressure in the pockets to increase the seal gap, making the seal gap essentially self-regulating in size. In addition, an opening is formed in the seal pocket extending through the stationary seal member and opening to a high pressure region within the housing, thereby permitting the incompressible fluid to flow from the seal pocket through the opening back into the seal housing, thereby increasing the flow of incompressible fluid along the face of the seal and through the pocket and opening and serving to cool the seal member. The size and position of the last mentioned opening also influence the pressure build-up in the pockets of the pads and consequently the size of the seal gap.

In another embodiment of this invention, the depth of the pocket in the sealing surface pad and the size of the opening for reducing pressure build-up in the pocket may both be regulated by wear of the pad, thereby increasing the pressure response of the seal member to seal wear.

Ordinarily, particulate matter of a size of 0.5 milli-inches or less will pass through the seal gap. However, in this invention, inasmuch as the seal pockets have passage ways extending from an inner portion thereof to the high pressure region of the seal housing, and inasmuch as the seal grooves and pockets are greater than about 15 milli-inches in depth, there is a high probability that particulate matter contained in the incompressible liquid of a significantly larger size than the seal gap at the sealing dam will pass through the grooves in the seal face into a sealing pocket and through the passageway therein back into the high pressure region of the seal housing without marring any of the critical faces on the sealing dam. Thus, the limiting size of particulate matter becomes the smallest dimension along the latter path.

DETAILED DESCRIPTION

In the review of the several embodiments of this invention hereinafter described, components or parts that are essentially identical in different embodiments will be identified by the same reference character and the differences in the embodiments will be specifically described using different reference characters.

Referring to the embodiment of this invention, illustrated in FIGS. 1 through 4, there is provided a housing 2 which forms a chamber 4 adapted to contain an incompressible fluid, such as a bearing lubricant, e.g., oil and the like, or water. A rotatable shaft 6 passes through housing 2 into chamber 4. A seal ring 8 is formed from multiple segments 10 (four such segments shown in FIG. 2) which are placed end to end, and made from a suitable material such as a carbon-graphite composition. Each segment 10 has an offset tongue portion 12 (FIGS. 2 and 3) with a diagonal face 14 which meets with a diagonally (shown) or rectangular cut groove portion 16 on the adjacent segment 10 to provide for continuous sealing structure irrespective of any expansion or contraction of the seal ring 8 or limited movement of the seal ring 8 toward and away from shaft 6. The segments 10 are urged into contact with shaft 6 by a garter spring 18 which is received in an arcuate circumferentially disposed channel 20 in the outer circumferential surface of each seal segment 10. In casing 2, higher pressure incompressible fluid is maintained in chamber 4 and a medium such as gas or another liquid at a lower pressure is maintained in region 5 of casing 2 downstream (i.e., to the right in FIG. 1) of a radial flange 24 formed in casing 2. The downstream faces 22 of segments 10 are urged against flange 24 of casing 2 by compression coil springs 26 contained respectively in pockets 28 of a closing ring 30 which is retained between casing shoulder 32 and a retaining ring 34.

The downstream or low pressure face 22 of each segment 10 also serves as a (secondary) sealing face and may be provided on a portion thereof with spaced radial grooves 36 (FIG. 3) connected to a peripheral groove 38 to permit the passage of fluid from chamber 4 into groove 38 to counterbalance in part the fluid pressure of the high pressure side 40 of seal segments 10 to reduce the pressure loading of the segments 10 against flange 24. Locking pins 43 (FIG. 1) are mounted in flange 24 to fit loosely in openings 46 in seal ring 8 to prevent the segments 10 from rotating and yet permit the segments to move toward and away from shaft 6. It will be noted that grooves 36 and 38 may be unnecessary when the fluid in chamber 4 is at a nominal increased pressure relative to the pressure in region 5 of housing 2.

It can therefore be seen that seal ring 8 is formed from the multiple seal segments 10 (four shown in this embodiment) to create, when assembled on shaft 6, an inner circumferential surface or main sealing surface 42 and an outer circumferential surface 44, connected together by a pair of radially extending faces 22 and 40. Inner circumferential surface 42 is positioned between high and low pressure chambers 4 and 5, respectively, to control the leakage therebetween. Outer circumferential surface 44 is exposed entirely to the higher pressure chamber 4, while radial face 22 cooperates with the face of chamber flange 24 to seal against a flow path therebetween from chamber 4 to region 5. The radial face 40 of seal ring 8 is entirely exposed to the high pressure in region 4.

Figure 3:
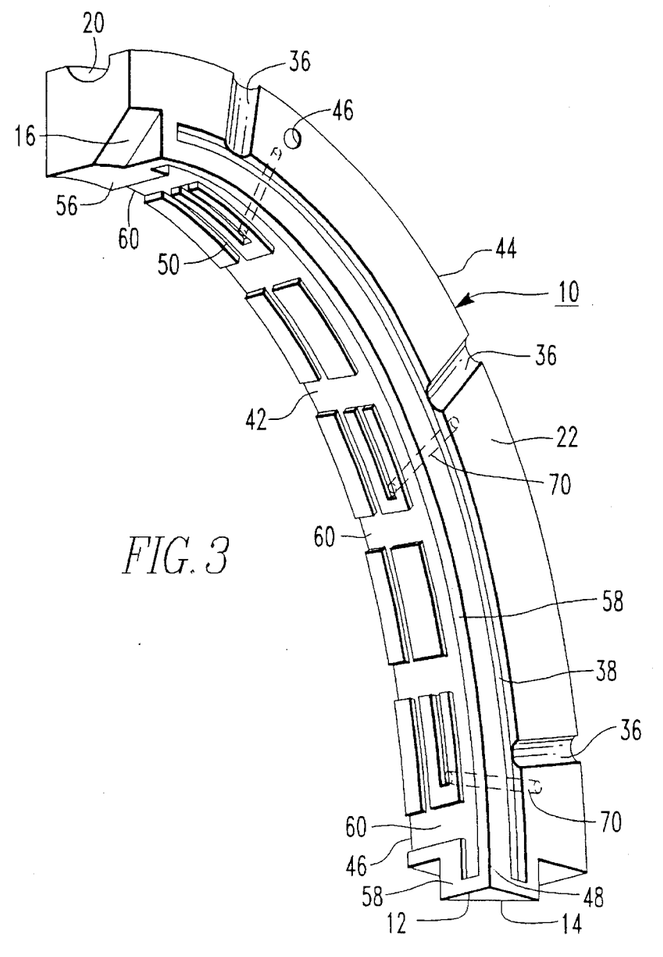
FIG. 3 is a perspective view of a segment of the stationary seal ring shown in FIG. 1 taken from the low pressure side.
Figure 4:
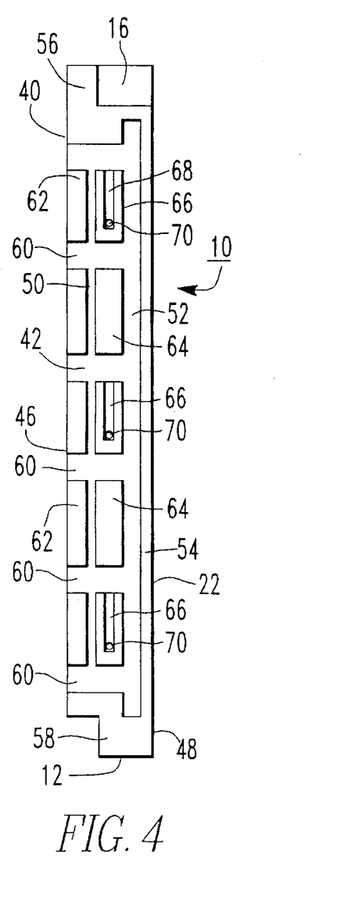
FIG. 4 is a development view of the sealing face of the seal ring of FIG. 3.

Referring to FIG. 4, it will be seen that sealing face 42 of each of the seal segments 10 includes a pair of generally parallel circumferential edges 46 and 48. The sealing surface 42 terminates in its dimension parallel to the axis of shaft 6 at these edges with edge 46 being on the high pressure side of sealing surface 42 and edge 48 being on the low pressure side of surface 42. A pair of circumferentially extending parallel grooves 50 and 52 which are formed in surface 42 extend parallel to but are spaced from the edges 46 and 48, respectively. Groove 52 is adjacent edge 48 on the low pressure side of the sealing surface 42 and a sealing dam 54 is thus formed on sealing surface 42 between groove 52 and edge 48. The sealing dam 54 extends along the entire inner edge 48 of the seal ring 8 so that it is essentially continuous. This is achieved, of course, at the ends of each segment 10 by the interfitting tongue portion 12 and groove portion 16 formed in the ends of the segments 10. The parallel grooves 50 and 52 terminate in each seal segment adjacent the tongue and groove portions but do not extend into the tongue and groove portions 12 and 16 so that an end dam is formed between the ends of the grooves 50 and 52 and the ends of each seal segment 10. Viewing FIGS. 3 and 4, the last-mentioned end dams are identified by the reference characters 56 and 58, respectively.

A plurality of spaced transverse grooves identified by the reference character 60 extend from the high pressure edge 40 on the sealing surface 42 to connect with each of the circumferential grooves 50 and 52. The grooves 50 and 52 and the transverse grooves 60 are desirably of the same depth and serve to form a first row of spaced pads 62 between groove 50 and edge 40 and a second row of spaced pads between grooves 50 and 52. The first row of spaced pads 62 serves, in this example solely, as wear pads between the seal ring 8 and the outer surface of shaft 6, and the pads in the second row, identified by the reference characters 64 and 66, alternate such that pads 64 serve as wear pads and pads 66 serve as lift pockets for the seal ring 8, to be described.

Figures 1, 2:
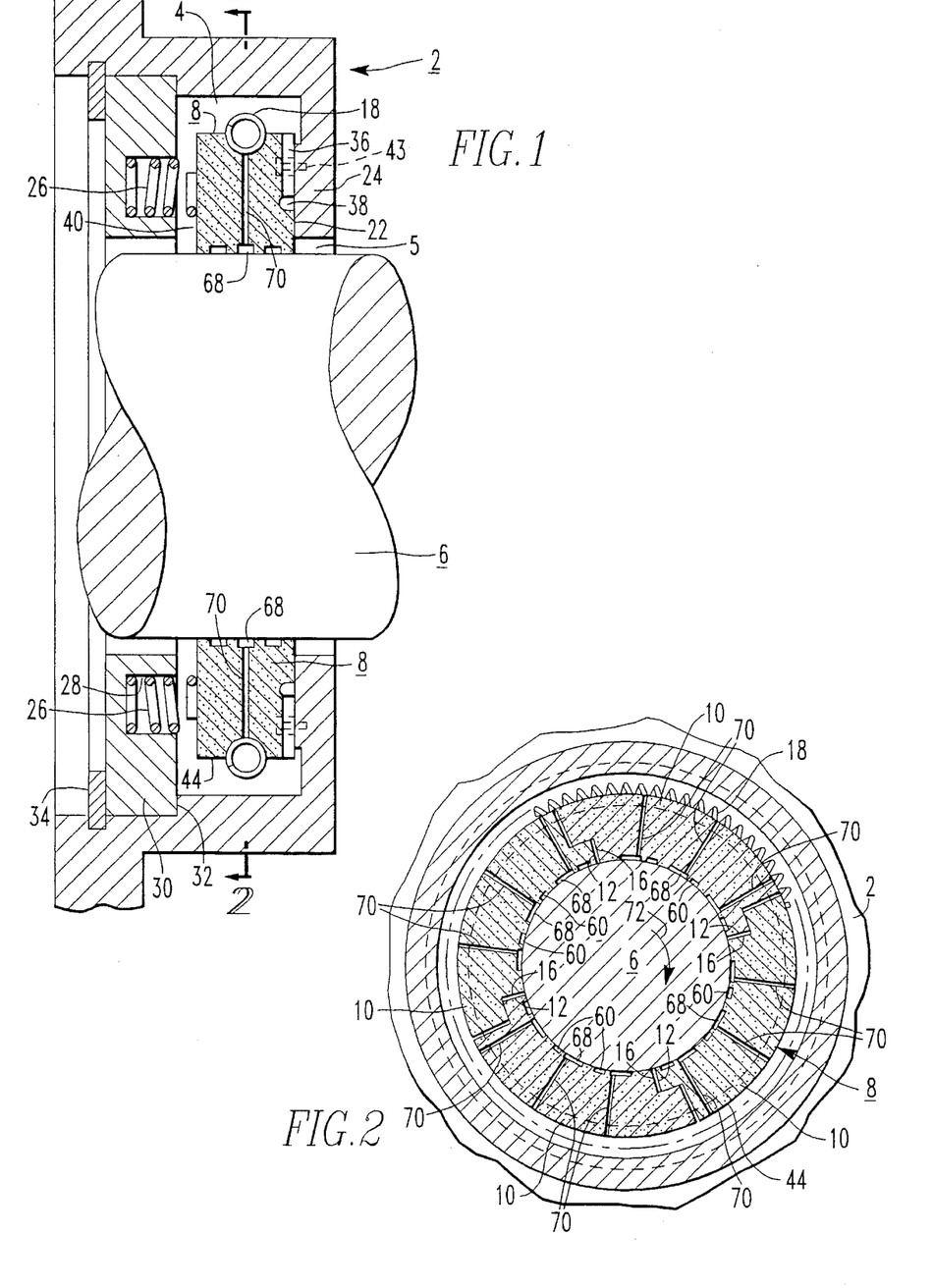
FIG. 1 is a vertical section through a seal assembly in accordance with this invention for sealing between a housing and a rotating shaft.
FIG. 2 is a vertical section of the seal in FIG. 1 taken on a plane indicated by the lines 2—2 in FIG. 1.

The lift pocket pads 66 are formed therein such that a central groove 68 is surrounded by a generally U-shaped raised pad. The groove 68 in pad 66 starts at a transverse groove 60 located at one end of the pad 66 and extends centrally in a circumferential direction, terminating short of the other end of the pad 66. Thus, as shown in FIG. 4, the upper ends of the grooves 68 open to the transverse grooves 60 in each seal segment 10, and the lower ends terminate short of the next lower transverse groove 60. The lift pockets formed by grooves 68 in pads 66 are positioned so that the open end is upstream of the lower end of the closed end of grooves 68 relative to the direction of shaft rotation, which direction is indicated by the arrow 72 (FIG. 2). Thus, rotation of the shaft 6 forces liquid into the open ends of the lift pocket grooves 68 to increase the pressure therein and to cause a radially outward force on seal segments 10 which tends to move seal segments 10 away from shaft 6 thereby increasing the seal gap therebetween. It will be seen that, when assembled, in this example, wear pads are formed on the sealing surface 42 of each seal segment 10 by the inner row of pads 62, by the alternate pads 64 positioned between the lift pocket pads 66, and by the dams 56 and 58 adjacent the ends of the seal segments 10. Of course, the outer surface of lift pocket pads 66 will also wear upon frictional engagement with the surface of shaft 6.

Positioned in each of the lift pocket grooves 68 and, in the example of FIGS. 1 through 4, at the innermost end thereof is a pressure adjusting vent opening or bleed orifice identified by the reference character 70 which extends in this embodiment from the base of the groove 68 entirely through the seal segment 10 to the outer circumferential side 44 thereof which is exposed to the high pressure of chamber 4. The lift pocket pads 66 and the grooves 68 therein are extremely short in length when compared to the circumferential length of each of the segments 10 and compared to the circumference of the seal ring 8.

SEAL OPERATION

In the embodiment of the invention of FIGS. 1 through 4, it will be seen that a seal ring 8 assembled in position in, for example, a higher pressure chamber 4 containing, for example, an oil lubricant, and wherein the adjacent segment 5 of the housing 2 contains a lower pressure medium, for example, air at atmospheric pressure or another gaseous medium at a lower pressure than the pressure in chamber 4, the seal will function as follows:

Garter spring 18 will move the seal segments 10 into contact with the outer surface of shaft 6, and coil springs 26 will move the low pressure surface 22 into engagement with the adjacent surface on flange 24. A sealing dam is formed by the raised edge 58 essentially entirely around the edge 48 of seal ring assembly 8. During normal operations, the shaft 6 is rotating; thus the pressure drop between the high and low pressure ambient is taken across the carbon seal segments 10, generating a radial force which combines with that of the garter spring 18 to move the carbon segments against the rotating shaft 6. On sealing surface 42, the high pressure from chamber 4 extends from edge 46 of ring segments 10 into transverse grooves 60 and circumferential grooves 50 and 52 and into the grooves 68 of the lift pockets 66. Fluid also flows through the bleed openings 70 through the seal ring segments 10 to the outer circumferential surface 44 thereof, which is exposed to the high pressure of chamber 4. However, by virtue of the rotation of the shaft in the clockwise direction for the seal assembly, illustrated by the arrow 72, a pressure rise is created in the lift pockets 68 by virtue of the velocity shearing gradient between the rotating shaft and stationary seal elements 10. This pressure rise acts against inward radial forces on the seal segments 10 to generate a lift force which is opposite in direction to the radial seating force generated by the ambient pressure drop between the seal dam 54 and shaft 6 and augmented by garter spring 18. In order to obtain an operating film, the lift force on seal ring 8 generated by the hydrodynamic lift pockets at zero film thickness must be greater than the seating force. The magnitude of the pressure rise due to the hydrodynamic effect in the lift pockets is primarily determined by the operating environments and hydrodynamic lift pocket geometries. Operating environmental factors include shaft speed, film thickness and temperature. More particularly, higher shaft speeds, lower fluid temperature, and smaller film thicknesses will each result in a high hydrodynamic pressure rise in the lift pockets. The geometric factors include the hydrodynamic lift pocket length and depth and the hydrodynamic bleed orifice diameter. A shallower pocket depth, longer pocket length and smaller hydrodynamic bleed orifices 70 will also result in higher pressures in the lift pockets. Engineering design has dictated that the seal of FIGS. 1 through 4 may be designed with operating film thicknesses for oil in the range of zero to 0.6 milli-inches. At design operating film thickness, the lift force generated by the lift pocket will equal the radial seating force; thus, the operating film thickness in this invention can be maintained to be self-regulating during operation cycles, because any decrease in oil film thickness due to sealing environment change will be responded to with a greater lift force generated by the lift pockets 68 to increase the film thickness and thus override the decrease in film thickness. Similarly, any increase in film thickness will be compensated by a smaller lift force generated by the pockets again to reduce the film thickness, thereby overriding an increase in film thickness.

It is an important feature of this invention that the lift pocket depth (i.e., the depth of groove 68 in the radial direction relative to shaft 6 of the lift pocket pads 66) be at least about 15 milli-inches (0.015 inch, 0.0381 cm.) in depth and no greater than about 40 milli-inches (0.040 inch, 0.1016 cm.) in depth. In this way, in the event there is a wearing away of the pads on the sealing surface 42 due, for example, to low shaft speed, the hydrodynamic design is such as to generate an increase in hydrodynamic forces to increase the separation force between the seal and the shaft, thereby making the sealing film thickness essentially self-regulating. To achieve this, the pocket depth must be substantial relative to the potential wear of the pads. For example, if the pocket depth were on the order of 1 milli-inch, wearing of the pads by 1 milli-inch would destroy the pocket and the sealing function; moreover, the self regulating film thickness function would then be destroyed. With this invention, the wear rate of surface 42 of the seal ring segments 10 will eventually approach zero.

The hydrodynamic bleed orifices 70, located along the pocket length, are used to control the pressure rise in the lift pocket in order to achieve the desired film thickness. In certain examples, the use of the bleed orifices may not be necessary. However, the provision of bleed orifices 70 has a number of important functions. In addition to controlling by orifice geometry (e.g., orifice diameter, orifice location in pocket, the magnitude of pressure rise in each of the pockets), the orifices form a flow path for the liquid medium to pass between the seal surface and the shaft, thereby cooling the seal segments 10. In addition, in the event particulate matter is contained in the medium, the size of the particulate matter accommodated by this seal may be greater than the film thickness between the sealing dam 58 and the shaft surface. More particularly, particulate matter which enters the sealing area may well flow with the liquid flow across the transverse grooves 60 and into the lift pockets 66 through the orifices 70 to return to another region of the chamber 4. The size of particulate matter therefore is controlled by the diameter of the bleed orifices 70 rather than by the size of the seal gap.

Figure 5:
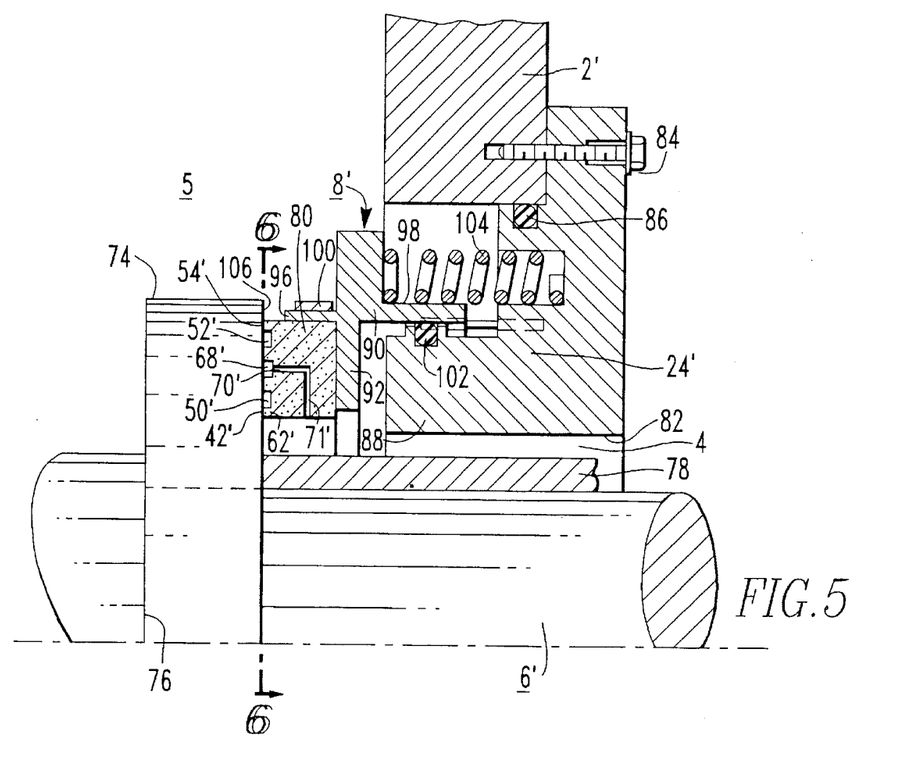
FIG. 5 is a vertical section partially broken away of a face type seal ring embodiment of this invention.
Figure 6:
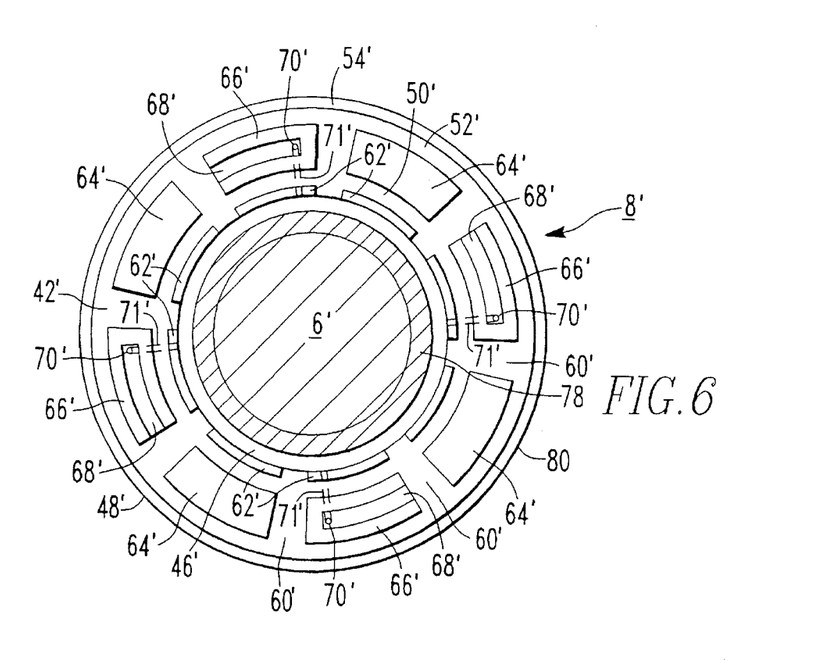
FIG. 6 is a vertical section of the seal ring of FIG. 5 taken in the plane indicated by the lines 6—6 in FIG. 5 and showing the seal face of the seal ring.

In FIGS. 5 and 6, there is provided an embodiment of this invention employing a face type seal 8' which is mounted for engagement with a circumferential shoulder or seal ring runner 74 extending radially outwardly from a rotating shaft 6'. The runner 74 is fixedly mounted on shaft 6' against an integral shoulder 76 formed on the shaft 6', and seal runner 74 is positioned to engage shoulder 76 by a suitable means such as a shaft spacer 78. In this embodiment of the invention, the higher pressure housing region is located to the right-hand side of the shaft of FIG. 5 adjacent the shaft and is depicted by the reference character 4, while the low pressure region 5 is located outwardly of runner 74 and outwardly of the seal ring 8'.

The rotating shaft 6' is mounted for rotation within a casing 2', only a portion of which is illustrated in FIG. 5, with the casing 2' including a radial flange 24' disposed thereon and having an opening therein surrounding shaft 6'. Flange 24' is of annular configuration and receives shaft 6' in the central opening 82 thereof. Flange 24' is secured in a leak type manner to casing 2' by suitable means such as by a plurality of bolts 84, only one of which is shown in FIG. 5; leakage between casing 2' and flange 24' is prevented by a sealing means such as O-ring 86. Flange 24' also includes an axially extending annular shoulder 88 extending parallel to the axis of shaft 6' and serving to mount seal assembly 8' on the outwardly facing surface thereof. Seal assembly 8' includes a unitary seal ring composite 80 formed from a suitable seal material such as a carbon graphite composite mounted on a metal backing ring identified by the reference character 90. The backing ring 90 includes a ring like member 92 extending radially with respect to shaft 6' and overlying a substantial portion of the seal ring composite 80. Ring 92 has a pair of annular axially extending flanges 96 and 98 (axial with respect to the axis of shaft 6') extending outwardly from the sides thereof in both axial directions. One of the annular flanges 96 overlies a portion of the seal composite 80 and the other annular flange 98 extends outwardly of flange 88 and closely receives it therein. To fixedly secure seal ring composite 80 to the backing ring 90, composite 80 is engaged by the left-hand radial surface (FIG. 5) of ring 92 and the inwardly facing surface of axially extending annular flange 96. A suitable means such as a shrink ring 100 is mounted on the outside of flange 96 to provide an inward force on flange 96 to ensure the securing of seal ring composite 80 to the backing ring 90. The axially extending annulus 98 extending outwardly to the right of ring 90 (FIG. 5) is positioned outwardly of flange 88 and closely receives its outer surface in the opening therein. Coacting between annulus 98 on seal ring assembly 8' and housing flange 24' is a sealing means such as an O-ring 102 mounted in a suitable recess in the outer surface of flange 88 to prevent leakage between seal assembly 8' and housing 2' along a path between annulus 98 and flange 88, yet formed to permit axial movement of seal assembly 8' toward and away from seal runner 74 and provides a primary sealing path between shaft 6' and seal assembly 8'. The limited movement of seal assembly 8' in the axial direction (relative to shaft 6') is limited in one direction by seal runner 74 on shaft 6' and in the other direction by the facing surface of flange 24'. Resilient means such as a plurality of coil springs 104, only one of which is illustrated in FIG. 5, extend between opposed surfaces of flange 24' and backing plate 90 to urge seal ring composite 80 into engagement with surface 106 on seal runner 74.

In the arrangement of the face type seal of FIGS. 5 and 6, it will be seen that high pressure from region 4 of housing 2' can pass to lower pressure region 5 within housing 2' only along a path between seal ring composite 80 and surface 106 of seal runner 74. Sealing along the latter path is perfected by seal ring assembly 8' which is urged into engagement with surface 106 on runner 74 by coil springs 104. The surface 42' on seal composite 80 of seal assembly 8' engages surface 106 on seal runner 74 to effect the sealing action as will be described.

Referring to FIG. 6, seal surface 42' is of annular configuration having an inner edge 46' exposed to the high pressure of chamber 4' and an outer edge 48' exposed to the lower pressure within chamber 5' of housing 2'. Edges 46' and 48' are concentric, and sealing surface 42' is provided with a pair of spaced concentric grooves 50' and 52' formed within sealing surface 42' with groove 50' being located adjacent high-pressure edge 46' but spaced outwardly therefrom and concentric groove 52' being located adjacent low pressure edge 48' of sealing surface 42', but spaced inwardly thereof. A plurality of spaced radial grooves extend from high-pressure edge 46' along sealing surface 42' and communicate with both circular grooves 50' and 52'. The radial grooves, depicted by the reference character 60', serve to conduct the high pressure liquid in chamber 4 to grooves 50' and 52'. Positioned between low pressure edge 48' of sealing surface 42' and adjacent concentric groove 52' is a continuous annular sealing dam 54', situated so that it is essentially of the same diameter as that of the inwardly facing surface of annulus 98, the latter surface being in contact with O-ring 102 mounted on flange 88, such that the balance diameter of seal assembly 8', defined by the position at which O-ring 102 contacts annulus 98, is essentially in axial alignment (relative to the axis of shaft 6') with the continuous sealing dam 54' on seal surface 42'.

The configuration of evenly-spaced radial grooves 60' and concentric groove 50' serves to form a plurality of inner wear pads depicted by the reference character 62', and the combination of grooves 60' and concentric grooves 50' and 52' provides a second concentric row of spaced pads 64' alternately spaced with pads 66' and located between grooves 50' and 52'. In this example, eight pads, four identified by the reference character 64' and four by the reference character 66', are provided in the second row. It will be seen that pads 64' serve as wear pads and pads 66', which also wear, serve as lift pockets for the seal assembly 8', as will be described. Thus, in the manner analogous to the arrangement shown in the embodiment of FIGS. 1 through 4, an inner row of spaced wear pads 62' is provided adjacent the high pressure edge 46' of sealing surface 42', and a second row of pads identified by the reference characters 64' and 66' is also provided, with the pads 64' and 66' in the second row alternating such that the pads 64' serve as wear pads and the pads 66' serve as lift pockets for the seal ring assembly 8'.

The lift pocket pads 66' are formed therein such that an arcuate central groove 68' is surrounded by a generally U-shaped raised pad 66'. The groove 68' in pad 66' starts at a transverse groove 60' located at one end of the pad 66' and extends generally centrally thereof in a circumferential direction, terminating short of the other end of the pad 66'. Thus, as shown in FIG. 6, the one end of each of the grooves 68' opens to the adjacent transverse groove 60' and the other end terminates short of the next transverse groove 60'. The lift pockets formed by groove 68' and pads 66' are positioned so that the open end of the pocket is upstream of the closed end of groove 68' relative to the direction of shaft rotation. Thus, rotation of the shaft forces liquid into the open end of the lift pocket grooves 68' to increase the pressure in the grooves 68' and causes a force to pressurize the grooves 68' to move the seal ring 8' away from seal runner 74, thereby increasing the seal gap depth between the seal assembly 8' and the movable runner 74 in the same manner as with the operation of seal 8 of the embodiment of FIGS. 1 through 4.

In this example, an axially extending opening (relative to the shaft axis) identified by the reference character 70' extends from the base of groove 68' through a portion of seal ring composite 80, where it contacts a radially extending opening 71' (FIG. 5) which places the interior of the lift pocket groove 68' in fluid communication with high pressure region 4 of housing 2'.

It is an important feature of this invention that the depth of groove 68' in the lift pocket pads 66' be at least about 15 milli-inches (0.0381 centimeters) in depth and no greater than about 40 milli-inches (0.1016 centimeters) in depth. As described in connection with the embodiment of FIGS. 1 through 4, in the event there is a wearing away of the pads 62', 64' and 66' on the sealing surface 42', for example, due to a low shaft speed, the hydrodynamic design operates to increase the hydrodynamic forces to increase the pressure in the lift pad grooves 68' to increase the separation force between the seal 8' and the runner 74, thereby making the seal film thickness essentially self-regulating. The depth of the pocket and lift pads 66' must be substantial relative to the amount of wear of the pads 66' such that the pocket does not disappear upon any wearing of the lift pad 66' in order to achieve the aforedescribed self-regulating feature. The hydrodynamic bleed orifices formed by openings 70' and 71', which serve to provide liquid communication between the inner edge of lift pad pocket 68' and the high pressure region 4, are formed to be L-shaped in this example because of the geometry of the seal ring structure, thus avoiding the necessity of matching openings extending through the composite 80 and the backing ring 90 of seal ring 8'. However, openings which provide communication between grooves 68' and the high pressure region 4 in any manner, e.g., which extend radially through composite 80 and backing ring 90, will also serve the same function as that illustrated in FIGS. 5 and 6.

It is to be further understood that the seal assembly 8' may be employed in applications having low pressure region near shaft 6' and high pressure outwardly of the seals, i.e., the reverse of regions 4 and 5 in FIGS. 5 and 6. For the latter modifications, the configuration of the seal face 42' would be reversed in the radial direction, with the sealing dam 54' located on the edge of the seal ring assembly 8' closest to shaft 6', and the housing flange 88 would have its outer surface aligned axially relative to the axis of shaft 6' so that the balance diameter of the seal ring assembly 8' is essentially in alignment with the diameter of sealing dam 54'. Further, the position of the bleed openings in lift pockets 68' would be modified to provide communication between the interior of grooves 68' with the high pressure region 4.

Figure 7:
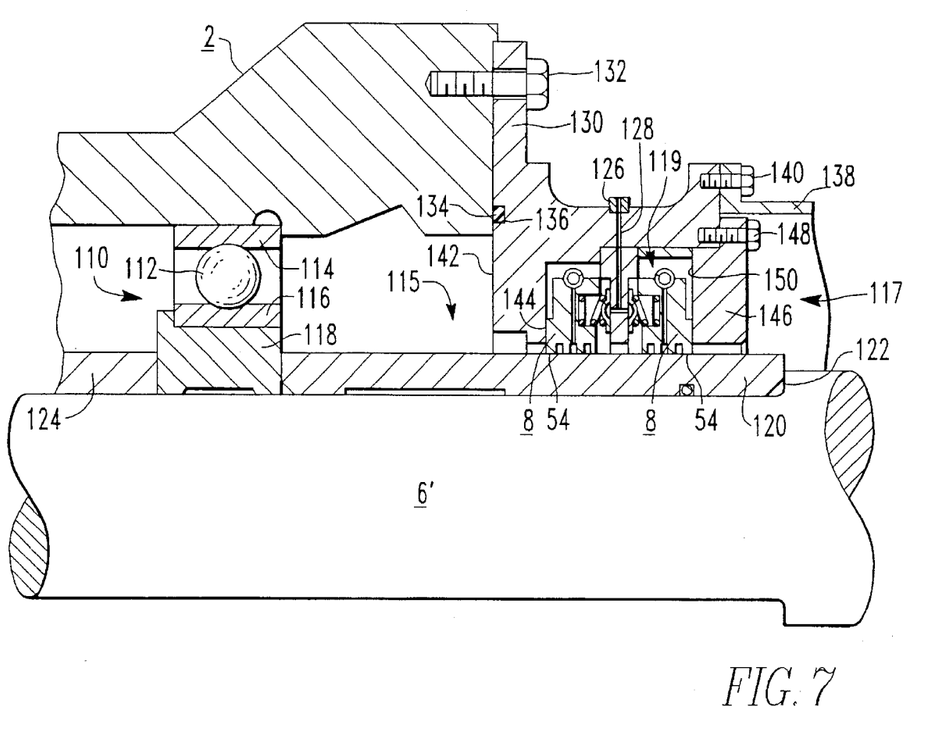
FIG. 7 is a view of an application of this invention employing a pair of seal rings disposed between a lubricating sump for a bearing for the rotating shaft and another housing region.

In the embodiment of the invention illustrated in FIG. 7, there is an arrangement wherein a pair of seal assemblies 8 are positioned in a housing high-pressure region 119 to separate a bearing 110 or the like located in a lower pressure housing region, such as region 115, which may be at essentially atmospheric pressure, from another region 117 of the housing wherein a higher pressure medium such as a gaseous medium is located. Accordingly, housing 2 has a rotating shaft 6 located therein and anti-frictional means such as a ball bearing assembly 110 including a plurality of balls 112, only one of which is shown in FIG. 7, disposed between race 114 secured to housing 2 and race 116 secured to rotating shaft 6. More particularly, race 116 is mounted on a support member 118 and is positioned on shaft 6 between spacer sleeve 120, mounted against shaft shoulder 122, and spacer sleeve 124, on the other side of the bearing support 118. Means (not shown) are provided for securing the other end of spacer sleeve 124 to the shaft in order to fixedly position bearing support 118 thereon. Housing 2 is provided with the high pressure region 119 which, in this example, is formed to contain an incompressible liquid, such as the bearing lubricant make-up, which is introduced under pressure into region 119 through nozzle 126 which communicates with region 119 through a T-shaped opening 128. The bearing 110 is mounted in housing 2, extended by a removable housing extension 130, which is secured at one end to housing 2 by suitable means such as bolts 132. A leak-tight joint between housing 2 and housing extension 6 is formed by the use of O-ring seal 134 located in recess 136 in housing extension 130, providing a seal between housing 2 and extension 130. Housing extension 130 is formed to contain two oppositely mounted seal assemblies as will be described. On the other end of housing extension 130 is a further housing extension 138, which is secured to housing extension 130 by suitable means such as bolts 140 and is sealed thereto by a sealing means (not shown). Housing extension 130 is provided with a downwardly extending flange 142 of annular configuration having a sealing surface 144 thereon which coacts with a complementary surface on left-hand seal assembly 8 to provide a secondary sealing face. Likewise, an annular ring member 146 is secured to the opposite end of housing extension 130 by suitable means such as by bolts 148 and has thereon a surface 150 which serves as a secondary sealing surface to coact with the right-hand seal assembly 8 of FIG. 7. In the event shaft bearing 110 is lubricated by oil and is to be maintained in housing region 115 at atmospheric or near atmospheric pressure, and the region 117 to the right-hand side of the two seal assemblies 8, i.e., the region created by housing extension 138, contains for certain applications a gaseous medium such as a hydrogen gas medium at an elevated pressure, it will be seen that the employment of two seal assemblies will serve to accommodate the rotating shaft 6 and maintain a minimum of leakage from the region 115 to the adjacent high pressure region 117 within housing extension 138. More particularly, in the event an oil sump region 115 is provided adjacent the bearing region at approximately 15 psi and the gaseous medium in region 117 is at an elevated operating pressure, for example, 80 psi, it will be seen that an incompressible lubricating liquid such as oil employed in the sump may be pumped into seal containing region 119 so that region 119 is normally maintained at a pressure somewhat greater than the pressure in region 117, for example, 85 psi, so that there is a 5 psi difference across the right-hand seal assembly 8 of FIG. 7 and a 70 psi difference across the left-hand seal assembly 8 of FIG. 7. The leakage of lubricant from region 119 to the oil sump region 115 is not particularly critical, since much additional lubricant is being added to the oil sump 115; however, the right-hand seal assembly 8 is provided so that it breaks down only approximately 5 psi of pressure, whereupon leakage flow across the left-hand seal assembly 8 is minimized and controlled within design limits so that the lubricant leakage into region 117 does not interfere with any functioning of the gaseous medium therein employed with the rotating device located to the right of FIG. 5 (and not shown herein). The left-hand seal assembly 8 is of a configuration, for example, illustrated in FIGS. 1 through 4 of this invention; its sealing dam 54 is positioned at the end of the sealing surface adjacent chamber 115 containing the bearing assembly 110, while the right-hand seal assembly 8 has its sealing dam 54 located on the edge of seal assembly 8 adjacent chamber 117 of the seal ring. In this example, each of the seal assemblies 8 will operate in the manner hereinbefore described, and of course, each of the seal assemblies 8 of FIG. 7 may be of a configuration illustrated in other embodiments of this application for Letters Patent, as will be hereinafter described. Thus, upon rotation of the shaft 6, a low leakage across the sealing face 42 of the left-hand side seal assembly 8 and a lower leakage from chamber 119 across the sealing face 42 of the right-hand seal assembly into chamber 117 will both occur, it being understood that the leakage flow across the left-hand seal assembly 8 will be greater than the leakage flow across the right-hand seal assembly 8 since the pressure drop thereacross is higher. Alternatively, the lift pocket geometry and therefore the pressure rise in the lift pockets may be so adjusted as to maintain appropriate leakage flows for the applications in which the seals are placed.

Figure 8:
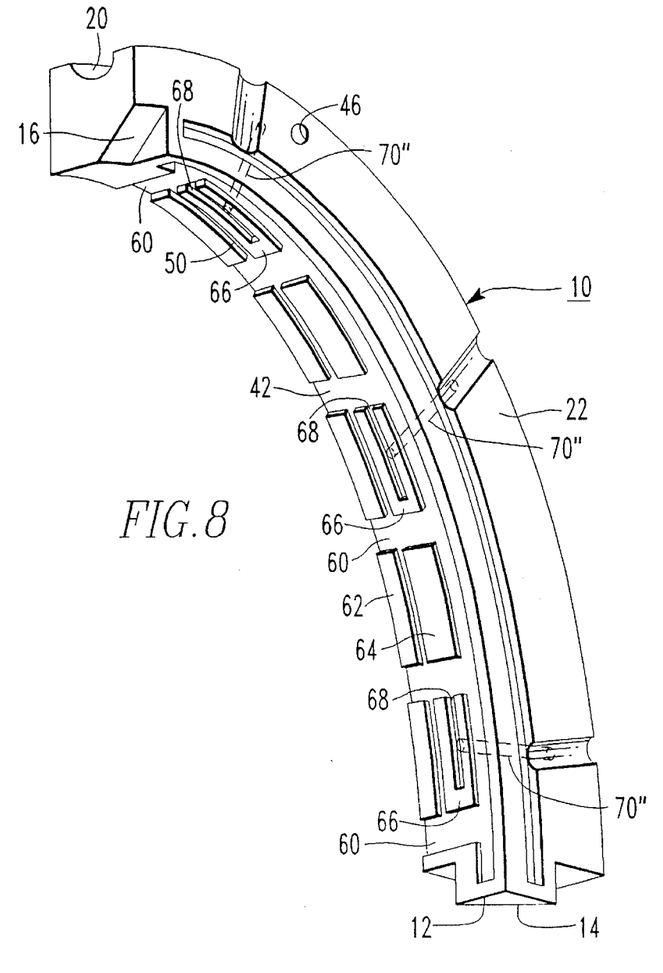
FIG. 8 is a perspective view of a segment of a seal ring illustrating a modification of this invention, taken from the low pressure side.
Figure 9:
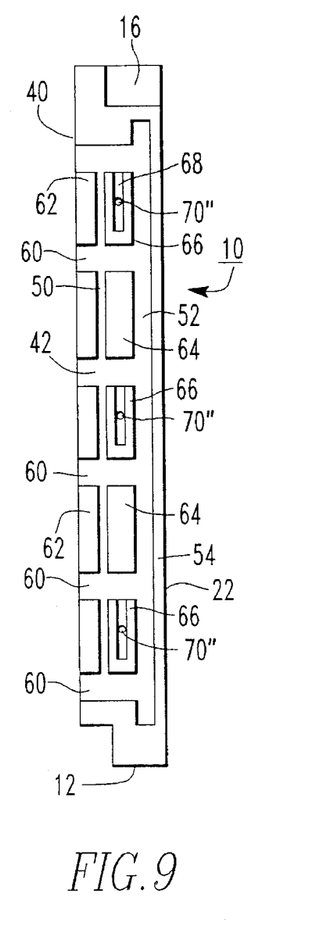
FIG. 9 is a development view of the sealing face of the seal ring of FIG. 8.

In the embodiment of this invention illustrated in FIGS. 8 and 9, the seal segments 10 are essentially the same as the seal segments 10 illustrated in FIGS. 3 and 4 except that the location of the bleed orifices of the lift pockets 68 in pads 66 has been varied. Thus, like parts of seal ring segments 10 serve the same function as described in the embodiment of FIGS. 1–4 and will not be described again. Rather, the differences in the embodiments will be emphasized. In the example of FIGS. 8 and 9, the bleed orifice 70" is located midway along the lift pocket groove 68 in pad 66, rather than at the end of the lift pocket groove as illustrated in FIGS. 3 and 4. In this example, therefore, the pressure build-up in the lift pockets is varied by reducing the effective length of the seal pockets and therefore its geometry, and may also be varied by varying the size of the bleed orifices 70" in order to meet design criteria for certain applications. The diameter of bleed orifices 70" may be as large as the width of grooves 68 in pads 66 or smaller as design criteria dictate.

Figure 10:
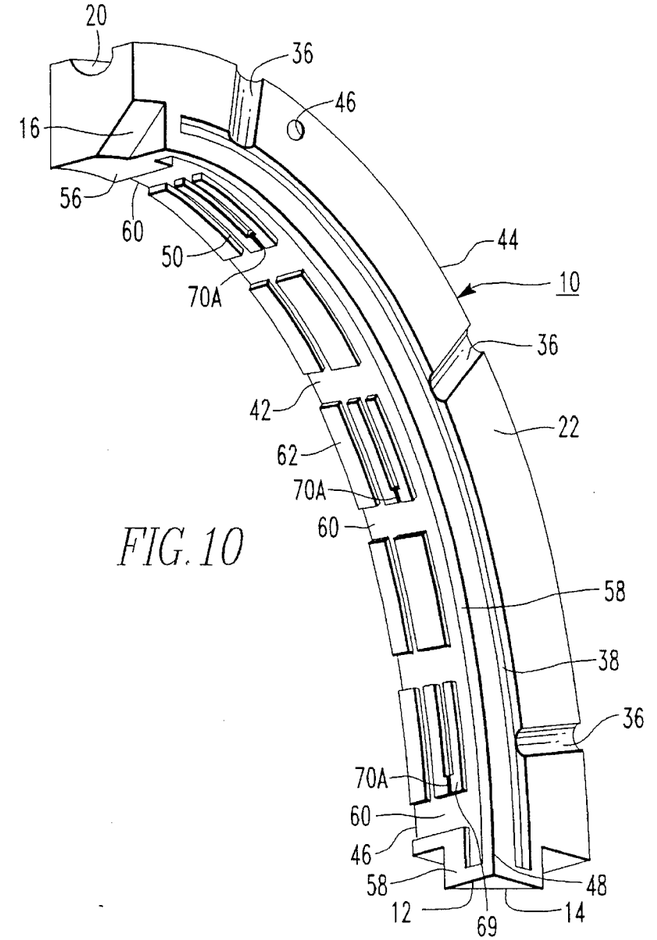
FIG. 10 is a perspective view of a segment of a seal ring in accordance with this invention taken from the low pressure side and illustrating still another modification of this invention.
Figure 11:
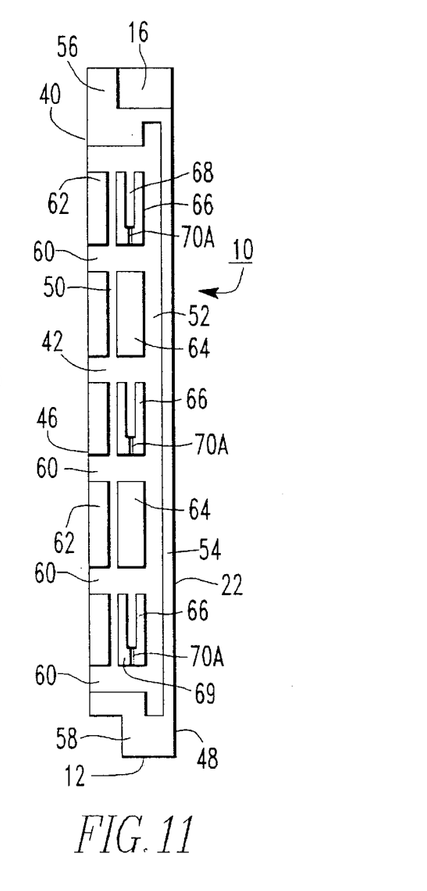
FIG. 11 is a development view of the sealing face of the seal ring segment of FIG. 10.
Figure 12:
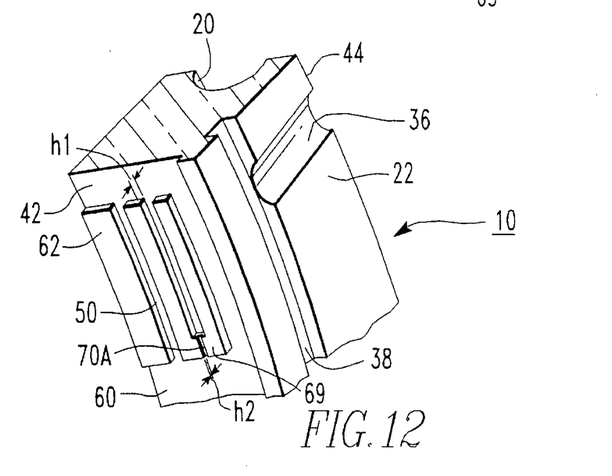
FIG. 12 is an enlarged fragmentary view of the segment of FIG. 10 illustrating the pad and pocket more clearly.

In the embodiment of the invention illustrated in FIGS. 10 through 12, it will be appreciated that the seal segments 10 are essentially the same as those of the embodiment of this invention illustrated in FIGS. 1 through 4. However, the lift pocket bleed orifices, rather than passing through the seal ring segments 10 to the rear surface 44 thereof, are formed by a relatively shallow groove extending from the inner end of the lift pocket groove 68 through the bight 69 of the U-shaped pad 66 to the adjacent transverse groove 60 in seal ring surface 42. Thus, the bleed orifices 70A comprise essentially shallow grooves formed on seal surface 42 located in the bight section 69 of lift pads 66. In the event of wear of the lift pads 66 and wear pads 62 and 64 on the sealing surface 42, wear will also occur on the surfaces of pads 66 adjacent the bleed orifices 70A, thereby reducing the size of bleed orifices 70A and increasing the pressure build-up within the grooves 68 of the lift pockets 66. In this way, not only is the depth of the lift pocket 66 reduced during wear, thereby increasing the pressure build-up therein, but the size of the bleed orifice 70A is concurrently reduced in this embodiment as a result of pad wear, to further increase the pressure build-up in the lift pockets and thereby to make the seal ring segments 10 even more self-regulating in response to wear of the seal ring segments. In FIG. 12, it will be seen that the depth of the lift pocket is defined by the dimension h1 and the depth of the bleed orifice is defined by the dimension h2 therein, and that any wear of the surface of the lift pocket pads 66 will modify (reduce) the dimensions h1 and h2 simultaneously.

Figure 13:
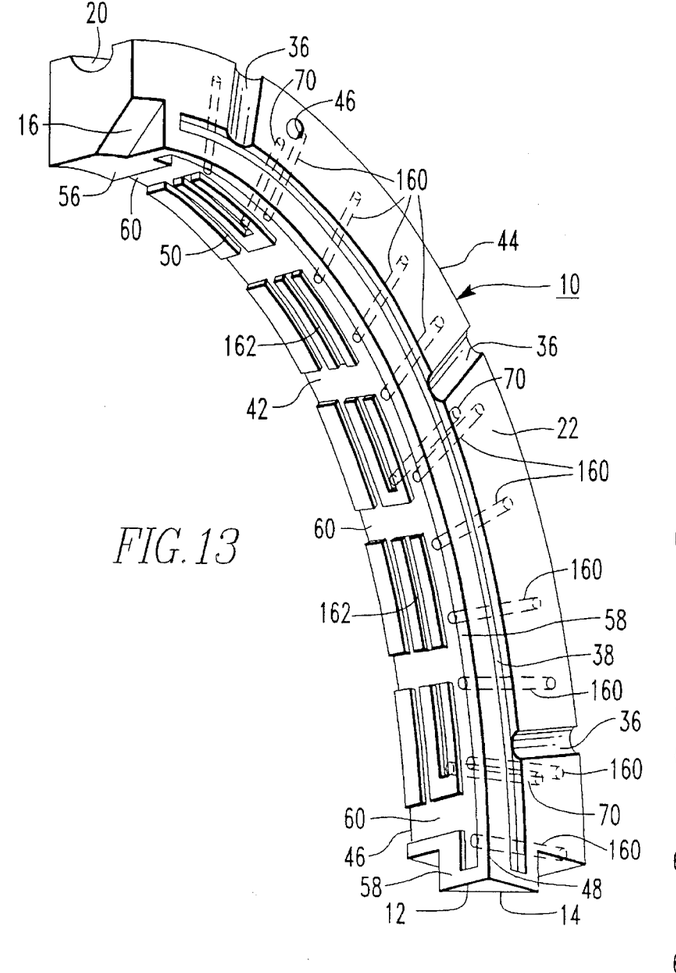
FIG. 13 is a perspective view of a seal ring segment illustrating another embodiment of this invention, taken from the low pressure side.
Figure 14:
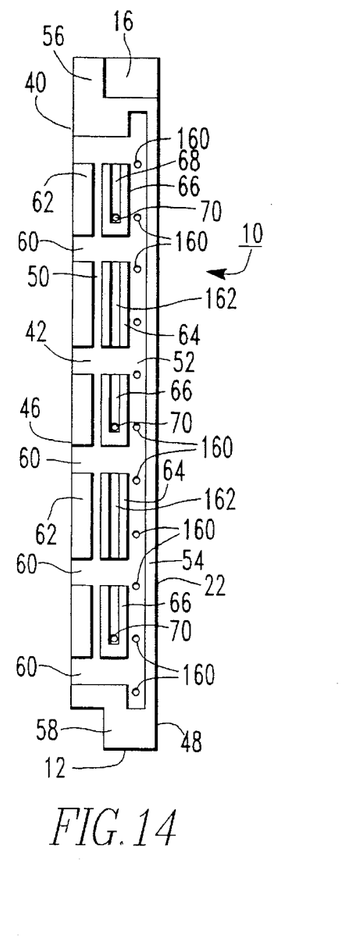
FIG. 14 is a development view of the sealing face of the seal ring segment of FIG. 13.

In the embodiment of this invention illustrated in FIGS. 13 and 14, the seal segments 10 are essentially the same as those illustrated in the embodiment of FIGS. 1 through 4. Like parts of seal ring segments 10 serve the same function as described in the embodiment of FIGS. 1–4 and will not be described again. However, differences in the embodiments will be emphasized.

A plurality of additional openings 160 are formed in each elongated groove 52 located adjacent sealing dam 54, which openings 160 extend from the inner surface of groove 52 entirely through seal ring segments 10 to the surface 44 on the remote side of seal ring segments 10. The additional openings 160 serve plural functions. The first is to ensure that the high pressure of region 4 is on the high pressure side of the sealing dam 54, since openings 160 communicate directly between the high pressure in region 4 and groove 52, and further to provide additional cooling of the seal segments 10 to prevent their distortion due to any frictionally induced heating thereof. The openings 160 further serve as a flow path for any particulate matter which enters groove 52 in order to prevent fouling by such particulate matter of the seal surfaces forming the seal gap between sealing dam 54 and the complementary sealing surface on shaft 6. Since the size of openings 160 is significantly greater than the size of the seal gap adjacent sealing dam 54, openings 160 serve as a flow path to conduct larger particulate matter away from the seal gap; thus seal assembly 8 may be employed in applications where larger particulate matter can be accommodated.

In addition, in the FIGS. 13 and 14 embodiment, the wear pads 64 are formed with elongated grooves 162 extending longitudinally from one end thereof to the other (i.e., from one transverse groove 60 to the next) and serve to provide further cooling of the wear pads 64 and, in turn, of seal ring segments 10.

Figure 15:
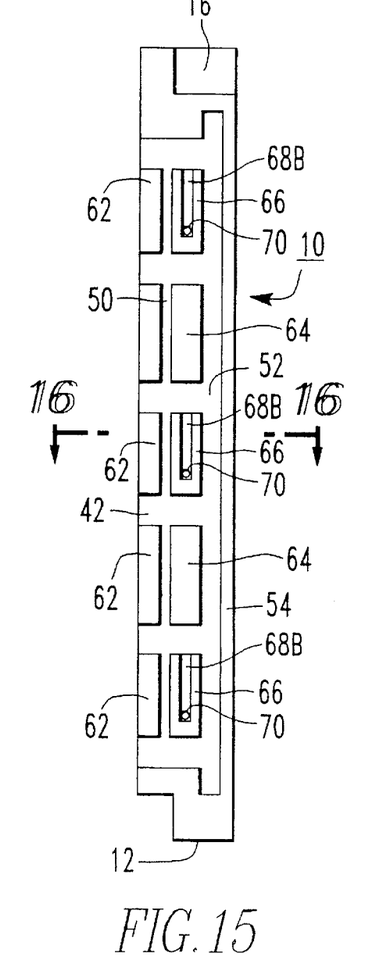
FIG. 15 is a development view of the sealing face of the seal ring segment depicting still another embodiment of this invention.
Figure 16:
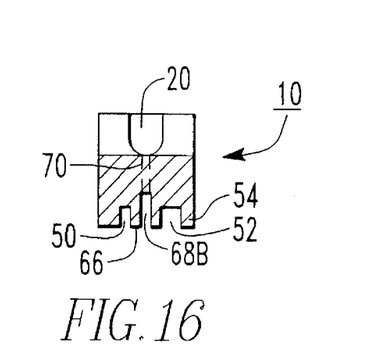
FIG. 16 is a sectional view through FIG. 15 taken along the lines 16—16 thereof.

Referring now to the embodiment of the invention illustrated in FIGS. 15 and 16, it is to be remembered that like parts of seal ring segments 10 serve the same function as described in the embodiment of FIGS. 1–4 and will not be described again. It is to be noted, however, that the depth of the grooves 68B in each of the lift pads 66 is greater than the depth of the adjacent parallel grooves 50 and 52. Thus, grooves 68B extend further into the sealing segments 10 and serve as another means for varying the magnitude of the pressure build-up in each of the lift pads 64.

Figure 17:
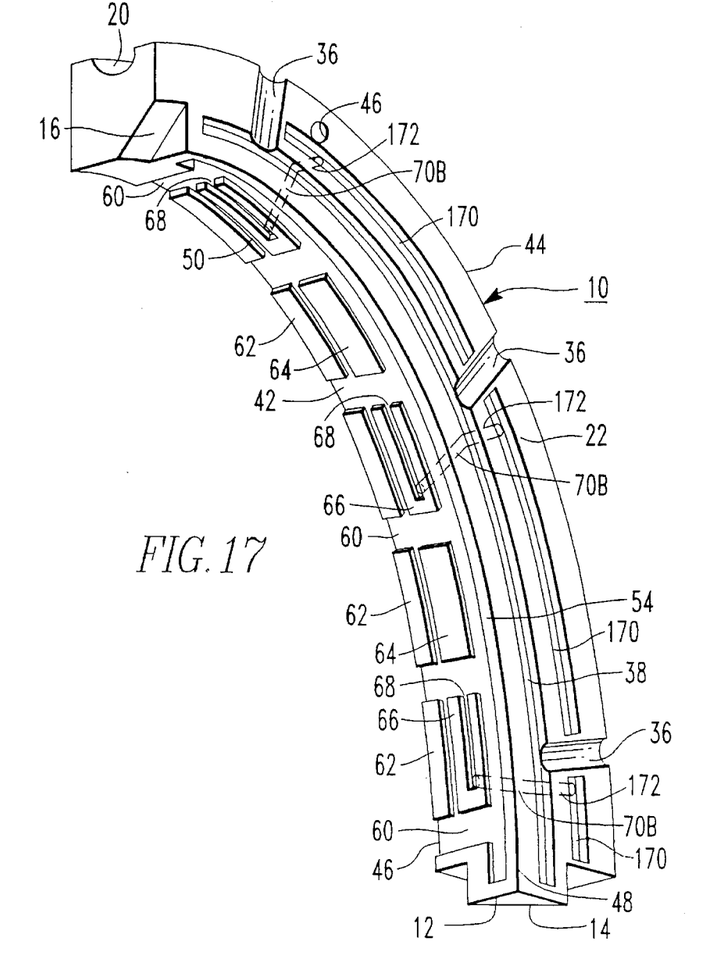
FIG. 17 is a perspective view of a seal ring segment illustrating a further embodiment of this invention, taken from the low pressure side.
Figure 18:
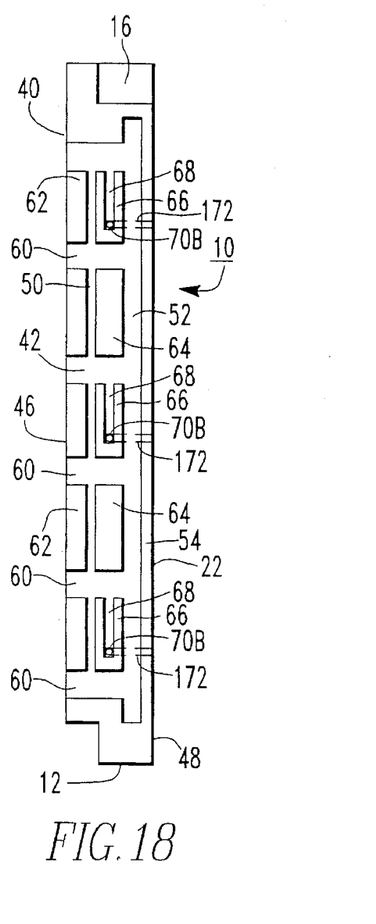
FIG. 18 is a development view of the sealing face of the seal ring segment of FIG. 17.

The embodiment of this invention illustrated in FIGS. 17 and 18 differs from prior embodiments in that the surface 22 of each of the seal ring segments 10 includes, in addition to radially extending grooves 36 which communicate with a circumferential groove 38 extending essentially parallel to the arcuate sealing surface 42 but spaced therefrom, additional grooves 170. Grooves 170 are positioned to extend in surface 22 parallel to groove 38 and concentric therewith yet spaced outwardly therefrom and terminating short of each of the radial grooves 36. Bleed openings 70B, which originate in each of the lift pockets 68, rather than going entirely radially through the seal ring segments 10, extend partially through the seal ring segments 10 and communicate with a transversely extending opening 172 which communicates with each of the grooves 170 located in seal ring surface 22. This embodiment, during seal operation, causes a pressure build-up in each of the grooves 170 so as to further reduce the pressure serving to bind surface 22 of each segment 10 against the adjacent housing surface on flange 24. The function of the bleed orifices 70B and 172 serve to further break down the pressure between seal ring surface 22 and the surface of housing flange 24 to prevent the possibility of binding of these surfaces. Since the pressure binding surfaces 22 to flange 24 under certain circumstances is greater than the pressure within region 4 of housing 2 by virtue of the force of springs 26, an opposing pressure in grooves 170 provided by bleed orifices 70B and 172 will offset that pressure, particularly since the pressure in lift pocket 68 is also greater than the pressure in region 4. Thus, the embodiment of FIGS. 17 and 18 may be employed for applications where there is a relatively high pressure drop across seal ring segments between chambers 4 and 5 within housing 2.

In this application, several variations of a seal ring employing hydrodynamic lift pockets have been illustrated. Combinations of the embodiments may be employed with each other and still fall within the spirit and scope of this invention. It is, therefore, specifically intended that this application be illustrative of this invention and not construed in a limiting sense except as required by the state of the prior art.

We claim:

1. A stationary seal member adapted to control and minimize the leakage of an incompressible fluid along a path between a sealing surface on said seal member and a complementary surface on a movable member adjacent to which said seal member is adapted to be mounted, said sealing surface terminating at two spaced edges, one of said edges adapted to be exposed to an incompressible fluid in a first region at relatively higher ambient pressure, the second of said edges being essentially continuous and being adapted to be exposed to a second region at a relatively lower ambient pressure, said sealing member being formed when in its operating position to isolate said first and second regions except along the aforementioned path, whereby the incompressible fluid is adapted to pass between said sealing surface and the complementary movable surface from said one edge toward said second edge, said stationary seal member being adapted to be resiliently mounted such that said sealing surface is movable under resilient force toward said complementary surface and into engagement therewith and against such resilient force away from said complementary surface to vary the gap between said sealing and said complementary surfaces, said stationary seal member having:

i. a sealing dam formed on such sealing surface adjacent said second edge and an elongated groove in said sealing surface positioned adjacent to and parallel with said sealing dam;

ii. said seal member having a plurality of spaced transverse grooves formed in said sealing surface and extending from said first edge thereof transversely across said sealing surface and terminating in said elongated groove forming a plurality of relatively short pads on said sealing surface between said groove, said first edge and the adjacent transverse grooves respectively;

iii. at least some of said pads each having a pocket formed therein and extending from one of said transverse grooves into the respective pad and terminating in said pad short of the adjacent transverse groove, each of said pockets being exposed to said complementary surface and being formed such that, when said movable surface moves relative to said sealing surface, incompressible fluid is moved into said pockets by the velocity shearing gradient between said movable and stationary members to generate an increased pressure in said pockets to urge said seal member away from said movable surface, said pocket being a depth sufficient in size such that upon moderate wear of the pad due to rubbing against said complementary surface, said pocket depth continues to be of sufficient size to maintain a velocity gradient induced pressure increase therein, said seal member being formed such that in the event of wear of said seal member pads to reduce the depth of said pocket, the velocity gradient in said pocket is increased to increase the pressure in said pocket, whereby said gap is increased and thus causing said gap to be self-regulating in size; and iv. said seal member having a bleed opening provided in the interior of said pocket passing through a portion of said seal member and communicating with a surface on said seal member that during operation is exposed to the level of pressure in said first region.

2. The seal member of claim 1 wherein said pocket is of a depth of at least about 15 milli-inches.

3. The seal member of claim 1 wherein said pocket is of a depth not greater than about 40 milli-inches in depth.

4. A stationary seal member adapted to control and minimize the leakage of an incompressible fluid along a path between a sealing surface on said seal member and a complementary surface on a movable member adjacent to which said seal member is adapted to be mounted, said sealing surface terminating at two spaced edges, one of said edges adapted to be exposed to an incompressible fluid in a first region at relatively higher ambient pressure, the second of said edges being essentially continuous and being adapted to be exposed to a second region at a relatively lower ambient pressure, said sealing member being formed when in its operating position to isolate said first and second regions except along the aforementioned path, whereby the incompressible fluid is adapted to pass between said sealing surface and the complementary movable surface from said one edge toward said second edge, said stationary seal member being adapted to be resiliently mounted such that said sealing surface is movable under resilient force toward said complementary surface and into engagement therewith and against such resilient force away from said complementary surface to vary the gap between said sealing and said complementary surfaces, said stationary seal member having:

i. a sealing dam former on such sealing surface adjacent said second edge a pair of generally parallel spaced grooves extending along said sealing surface, one of said grooves positioned adjacent said sealing dam and the other groove located in said sealing surface intermediate said first groove and said first edge of said sealing surface;

ii. said seal member having a plurality of spaced transverse grooves formed in said sealing surface and extending from said first edge thereof transversely across said other of said parallel grooves and terminating in said first of said parallel grooves forming a plurality of relatively short pads on said sealing surface between said parallel grooves and the adjacent transverse grooves respectively;

iii. at least some of said pads each having a pocket formed therein and extending from one of said transverse grooves into the respective pad and terminating in said pad short of the adjacent transverse groove, each of said pockets being exposed to said complementary surface and being formed such that, when said movable surface moves relative to said sealing surface, incompressible fluid is moved into said pockets by the velocity shearing gradient between said movable and stationary members generate an increased pressure in said pockets to urge said seal member away from said movable surface, said pocket being a depth sufficient in size such that upon moderate wear of the pad due to rubbing against said complementary surface, said pocket depth continues to be of sufficient size to maintain a velocity gradient induced pressure increase therein; said seal member being formed such that in the event of wear of said seal member pads to reduce the depth of said pocket, the velocity gradient in said pocket is increased to increase the pressure in said pocket, whereby said gap is increased and thus causing said gap to be self-regulating in size;

iv. said seal member is adapted to be positioned surrounding a rotating shaft and, when said complementary surface is adapted to be a surface on the circumference of said rotating shaft, said seal member being ring shaped and formed from a plurality of seal segments mounted end to end to form said ring, and said seal member having means between each segment to prevent leakage flow from the first region to said second region along a path between said segments, each of said segments having at least one of said pockets formed therein and resilient means mounted on said seal member urging said segments in the direction toward said shaft surface to reduce the thickness of the gap between the shaft and the seal member.

5. In a housing having a rotating shaft extending therethrough and a high pressure region containing an incompressible fluid and a lower pressure region, said shaft having a rotatable sealing surface thereon, a relatively stationary sealing ring surrounding a portion of said shaft, said stationary sealing ring having a primary seal surface thereon and positioned to face said shaft sealing surface and to move toward and away therefrom, resilient means biasing said stationary sealing ring into engagement with said rotatable shaft at said shaft sealing surface, means in said housing formed with a stationary secondary seal surface thereon, said stationary sealing ring having a secondary seal surface thereon facing said stationary secondary seal surface, said primary seal surface terminating at two spaced edges, one of said edges being exposed to the pressure in said high pressure region of said housing and the other of said edges being exposed to the region of lower pressure, whereby the incompressible fluid in said housing flows along said primary seal surface from said one edge toward the other edge, said stationary sealing ring being movable under resilient force toward said shaft sealing surface and into engagement therewith and against said resilient force away from shaft sealing surface to vary the gap between said primary seal surface and said shaft sealing surface, said stationary sealing ring having:

i. a sealing dam formed on said primary seal surface adjacent said other edge and an elongated groove extending in said primary seal surface parallel to and positioned adjacent said sealing dam;

ii. said sealing ring having a plurality of spaced transverse grooves formed in said primary seal surface and extending from said first edge thereof transversely across said primary seal surface and terminating in said elongated groove forming a plurality of pads on said primary sealing surface between said first edge and said elongated groove and between the adjacent transverse grooves, respectively;

iii. at least some of said pads each having a pocket formed therein and extending from one of said transverse grooves into the respective pad and terminating in said pad short of the adjacent transverse groove, each of said pockets being exposed to said shaft sealing surface and being formed such that, when said shaft sealing surface moves relative to said primary seal surface, incompressible fluid from the high pressure region is moved into said pockets by the velocity shearing gradient between said shaft and said stationary sealing ring to generate an increased pressure in said pockets to urge said sealing ring away from said shaft sealing surface, said pocket depth at least about 15 milli-inches so that it is sufficient in size such that upon moderate wear of the pad due to rubbing against said shaft sealing surface, said pocket depth continues to be of sufficient size to maintain a velocity gradient-induced pressure increase therein, and said sealing ring being formed such that in the event of wear of said sealing ring pads to reduce the depth of said pocket, the velocity gradient in said pocket is increased to further increase the pressure in said pocket, whereby said gap is increased and thus causing said gap to be self-regulating in size.

6. In the seal assembly of claim 5, said sealing ring having vent openings formed therein, each open at one end to the interior of one of said pockets and open at the other end to a surface on said sealing ring which is exposed to high pressure.

7. In the seal assembly of claim 5, said secondary seal housing surface and said secondary sealing ring surface both extending in the radial direction relative to the axis of said shaft, said secondary sealing ring surface extending radially from said sealing dam, said secondary sealing ring surface having an elongated recess formed therein, said sealing ring having a vent opening provided in the interior of said pocket passing through a portion of said sealing ring and communicating with said elongated recess in said secondary sealing ring surface.

8. In the seal assembly of claim 5, the sealing ring being formed from a plurality of circumferentially spaced seal segments mounted end to end, said sealing ring having means between each segment to prevent leakage flow along a path radially between said segments, and each segment having at least one of said pockets formed therein.

9. In the seal assembly of claim 8, said secondary sealing ring surface being formed by a radial surface on each of said segments, each segment having a recess formed in said radial surface thereof, each of said sealing ring segments having at least one bleed opening provided in the interior of said pocket formed therein extending through a portion of said segment and communicating with the recess formed in said radial surface thereof, whereby the pressure between said secondary sealing surfaces is relieved.

10. A stationary seal member adapted to control and minimize the leakage of an incompressible fluid along a path between a sealing surface on said seal member and a complementary surface on a movable member adjacent to which said seal member is adapted to be mounted, said sealing surface terminating at two spaced edges, one of said edges adapted to be exposed to an incompressible fluid in a first region at relatively higher ambient pressure, the second of said edges being essentially continuous and being adapted to be exposed to a second region at a relatively lower ambient pressure, said sealing member being formed when in its operating position to isolate said first and second regions except along the aforementioned path, whereby the incompressible fluid is adapted to pass between said sealing surface and the complementary movable surface from said one edge toward said second edge, said stationary seal member being adapted to be resiliently mounted such that said sealing surface is movable under resilient force toward said complementary surface and into engagement therewith and against such resilient force away from said complementary surface to vary the gap between said sealing and said complementary surfaces, said stationary seal member having:

i. a sealing dam formed on such sealing surface adjacent said second edge and an elongated groove in said sealing surface positioned adjacent to and parallel with said sealing dam;

ii. said seal member having a plurality of spaced transverse grooves formed in said sealing surface and extending from said first edge thereof transversely across said sealing surface and terminating in said elongated groove forming a plurality of relatively short pads on said sealing surface between said groove, said first edge and the adjacent transverse grooves respectively;

iii. at least some of said pads each having a pocket formed therein and extending from one of said transverse grooves into the respective pad and terminating in said pad short of the adjacent transverse groove, each of said pockets being exposed to said complementary surface and being formed such that, when said movable surface moves relative to said sealing surface, incompressible fluid is moved into said pockets by the velocity shearing gradient between said movable and stationary members to generate an increased pressure in said pockets to urge said seal member away from said movable surface, said pocket being a depth sufficient in size such that upon moderate wear of the pad due to rubbing against said complementary surface, said pocket depth being between at least about 15 milli-inches and not deeper than about 40 milli-inches so that it continues to be of sufficient size to maintain a velocity gradient induced pressure increase therein, said seal member being formed such that in the event of wear of said seal member pads to reduce the depth of said pocket, the velocity gradient in said pocket is increased to increase the pressure in said pocket, whereby said gap is increased and thus causing said gap to be self-regulating in size.

* * * * *